UNITED STATES PATENT OFFICE 2,124,891

COMPOUNDS OF THE 3.4.8.9-DIBENZOPY-RENE-5.10-QUINONE SERIES

Heinrich Neresheimer, Robert Held, and Anton Vilsmeier, Ludwigshafen-on-the-Rhine, Germany, assignors to General Aniline Works, Inc., New York, N. Y., a corporation of Delaware No Drawing. Application September 29, 1937, Serial No. 166,346. In Germany September 30, 1936

4 Claims. (Cl. 260—61)

The present invention relates to compounds of the 3,4,8,9-dibenzpyrene-5,10-quinone series.

We have found that valuable compounds of the said series are obtained by treating hydroxy compounds of Bz3.Bz4-phthaloyl-3,4,8,9-dibenzopyrene-5,10-quinones with alkylating or aralkylating agents. The hydroxy compounds serving as initial materials may be prepared by the oxidation of Bz2.Bz2'-dibenzanthronequinones by means of nitrosyl-sulphuric acid in the presence of sulphuric acid. By this process one Bz-ring is oxidized by the nitrosyl-sulphuric acid. The hydroxy compounds of Bz3.Bz4-phthaloyl-3,4,8,9-dibenzopyrene-5,10-quinones formed have the general formula:—

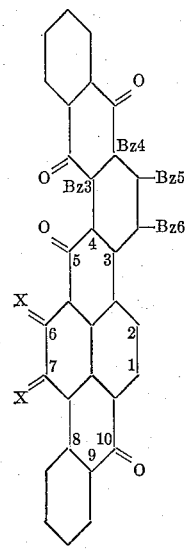

wherein one or both X's stand for hydroxyl groups. They dissolve in concentrated sulphuric acid, usually giving a carmine-red coloration and they yield carmine-red to violet dyeings. Their alkali salts dye cotton usually in brownish violet shades.

As initial materials for the preparation of the said compounds there may be mentioned not only Bz2.Bz2'-dibenzanthrone-quinone itself but especially its alkyl, halogen and hydroxy compounds. In some cases the oxidation of the Bz2.Bz2'-dibenzanthronequinones may be combined in one working operation with their preparation, as for example from the corresponding 2.2'-dibenzanthronyls, dibenzanthrones, Bz2-hydroxy- and Bz2.Bz2'-dihydroxydibenzanthrones and their ethers or esters.

The oxidation is prompted by the addition of small amounts of catalytic substances, as for example vanadic acid, or selenium, mercury or manganese compounds.

For example if Bz2,Bz2'-dibenzanthronequinone or a compound which is converted into the same under the working conditions, such as Bz2-hydroxydibenzanthrone, Bz2.Bz2'-dihydroxydibenzanthrone or their o-alkyl or acyl compounds, be treated in 82 per cent sulphuric acid in the presence of a small amount of vanadic acid with nitrosyl-sulphuric acid at about 120° C., the whole being poured into water after completion of the reaction, there is obtained in a practically quantitative yield an orange colored product which, according to analysis and its properties, is Bz3,Bz4-phthaloyl-6-hydroxy-3,4,8,9-dibenzopyrene-5,10-quinone.

As alkylating or aralkylating agents there may be mentioned for example alkyl or aralkyl halides and alkyl and aralkyl esters of sulphuric acid and of sulphonic acids. The new products thus obtained are generally speaking vat dyestuffs which yield on cotton dyeings and prints usually of yellow to orange shades and of good fastness properties.

The following examples will further illustrate how the said invention may be carried out in practice but the invention is not restricted to these examples. The parts are by weight.

Example 1

A solution of 10 parts of Bz2,Bz2'-dibenzanthronequinone, 0.2 part of ammonium vanadate and 60 parts of nitrosyl-sulphuric acid containing 16.5 per cent of nitrous acid in 200 parts of 82 per cent sulphuric acid is stirred at 120° C. until the evolution of nitrous gases has ceased and dibenzanthronequinone can no longer be detected. The mixture is then cooled to about 100° C.; 27 parts of water are allowed to flow in at this temperature and after cooling to about 70° C. the deposited brown-violet needles are filtered off by suction and washed first with about 80 per cent sulphuric acid and then with water, the crystals assuming a brilliant orange color. The Bz3,Bz4-phthaloyl-6-hydroxy-3,4,8,9-dibenzopyrene-5,10-quinone thus obtained in a good yield is soluble with difficulty in most organic liquids and readily soluble in concentrated sulphuric acid giving a carmine-red coloration. From a carmine-red vat it yields on cotton brown-violet dyeings which are converted by hydrolysis into a powerful orange. Further amounts of a less pure reaction product may be recovered from the sulphuric acid mother liquor.

The same compound is obtained by subjecting Bz2-hydroxy-, Bz2,Bz2'-dihydroxy- or Bz2,Bz2'.Bz3-trihydroxydibenzanthrone to the said oxidation instead of Bz2,Bz2'-dibenzanthronequinone.

10 parts of Bz3,Bz4-phthaloyl-6-hydroxy-3,4,8,9-dibenzopyrene-5,10-quinone are intimately mixed with 20 parts of dimethyl sulphate. The mixture is introduced during the course of 2 hours in batches into a boiling mixture of 250 parts of trichlorbenzene and 15 parts of potassium carbonate. The whole is kept boiling for some hours until unchanged initial material is no longer detectable. The whole is then allowed to cool, filtered off and the residue freed from adherent solvent in the usual manner. The methyl ether thus obtained may be purified by recrystallization from nitrobenzene, from which it is obtained in the form of long orange-colored needles which are soluble in sulphuric acid giving a carmine-red coloration. It dyes cotton brilliant orange shades of excellent fastness properties from a carmine-red vat.

The same compound is obtained by using para-toluene sulphonic acid methyl ester instead of di-methyl sulphate.

If diethyl sulphate be used instead of dimethyl sulphate, the corresponding ethoxy compound is obtained in the form of orange needles. It dyes cotton somewhat more reddish shades than the methoxy compound from a carmine-red vat.

Example 2

480 parts of water are allowed to flow during the course of about an hour at room temperature into a solution of 4 parts of ammonium vanadate and 1200 parts of nitrosyl-sulphuric acid containing 16.5 per cent of nitrous acid in 4000 parts of 96 per cent sulphuric acid. The mixture is then heated to 150° C. and 150 parts of the bromination product of Bz2,Bz2'-dimethoxydibenzanthrone, prepared according to Example 1 of the British Patent No. 205,304, are gradually introduced at the said temperature. The whole is then stirred at the said temperature until the reaction is completed; 180 parts of water are then allowed to flow in at about 100° C. and the deposited violet-brown needles are filtered off by suction. After washing with water, a dibromo substitution product of the Bz3,Bz4-phthaloyl - 6 - hydroxy-3,4,8,9 - dibenzo-pyrene-5,10-quinone described in Example 1 is obtained which is very similar in its reactions and its tinctorial behaviour to the compound free from bromine. Further fractions of the oxidation product, which are less pure, can be obtained by diluting the sulphuric acid mother liquor in stages.

From the dichloro derivative of Bz2,Bz2'-dibenzanthronequinone, obtainable according to Examples 1 to 3 of the German specification No. 546,678, there may be obtained by the treatment above described a monochloro substitution product of the compound described in the first paragraph of Example 1, and from 6,6'-dichlor-Bz2,Bz2'-dimethoxydibenzanthrone (obtainable according to the said British Patent No. 205,304) there may be obtainable a dichloro substitution product of the compound described in the first paragraph of Example 1.

10 parts of this dibrominated Bz3,Bz4-phthaloyl-6-hydroxy-3,4,8,9 - dibenzopyrene-5,10 - quinone are heated to boiling with 20 parts of para-toluene sulphonic acid methyl ester and 250 parts of trichlorbenzene. About 5 parts of dry potassium carbonate are added to the mixture in small batches during the course of some hours. When unchanged initial material is no longer present, the whole is allowed to cool and is worked up in the manner described in Example 1. The new compound crystallizes from nitrobenzene in the form of orange coloured needles. It dyes cotton brilliant orange shades of very good fastness from a carmine-red vat.

If the mono- or dichloro compound obtainable according to paragraph 2 be used instead of the dibromo compound specified in paragraph 3 corresponding dyestuffs having similar properties are obtained.

Example 3

10 parts of Bz3,Bz3'-dihydroxydibenzanthrone-Bz2,Bz2'-quinone (cf. Example 3 of the U. S. application Ser. No. 89,652) are dissolved in 200 parts of concentrated sulphuric acid. 40 parts of water are then added and at about 100° C. nitrosyl-sulphuric acid containing 16.5 per cent of nitrous acid is introduced until a sample withdrawn dissolves in a mixture of pyridine and acetic anhydride giving a yellow coloration and practically no fluorescence. The crystals deposited by cooling the sulphuric acid solution are filtered off by suction and boiled with dilute sodium bisulphite solution until they have been converted into brownish colored flakes. The whole is filtered by suction and the residue washed with water and dried. For the purpose of further purification, the compound thus obtained may be recrystallized from nitrobenzene. It dissolves in concentrated sulphuric acid giving a red-violet coloration and in pyridine giving a red coloration which changes to yellow on the addition of acetic anhydride. With sodium hydrosulphite and alkali it yields a red vat tinged with violet. The compound is Bz3,Bz4-phthaloyl - 6,7 - dihydroxy - 3,4,8,9-dibenzopyrene-5,10-quinone.

If, instead of the dihydroxyquinone used in paragraph 1 there be used the dibromo compound obtainable according to Example 4 of the said U. S. application Ser. No. 89,652, a compound having similar properties is obtained.

10 parts of the said Bz3,Bz4-phthaloyl-6,7-dihydroxy-3,4,8,9-dibenzopyrene-5,10-quinone are methylated with para-toluene sulphonic acid methyl ester as described in Example 2.

The Bz3,Bz4-phthaloyl-6,7-dimethoxy-3,4,8,9-dibenzopyrene-5,10-quinone crystallizes from nitrobenzene in yellow needles. It yields pure yellow, fast dyeing from a carmine-red vat.

A yellow dyestuff is also obtained from the dibromo compound used in the third paragraph of Example 2.

Example 4

10 parts of the hydroxy compound used in Example 1 are stirred with 100 parts of benzotrichloride for some hours at a temperature of from 150° to 155° C. When unchanged initial material can no longer be detected under the microscope, the whole is allowed to cool and the deposited small orange needles are filtered off and freed from adherent benzotrichloride in the usual manner. A dyestuff containing chlorine is obtained which dyes cotton from a bluish red vat brown-orange shades which are fast to chlorine, washing and light. It dissolves in sulphuric acid giving a carmine-red coloration.

What we claim is:

1. A vat dyestuff of the dibenzpyrenequinone series having the general formula

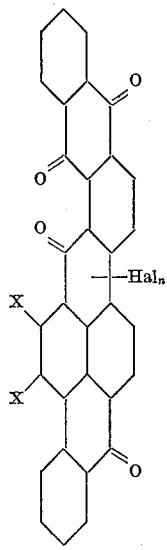

wherein X stands for a member selected from the class consisting of hydrogen and —O-alkyl-, at least one X being —O-alkyl, and $n$ for a whole number less than 3.

2. The vat dyestuff of the dibenzpyrenequinone series having the formula

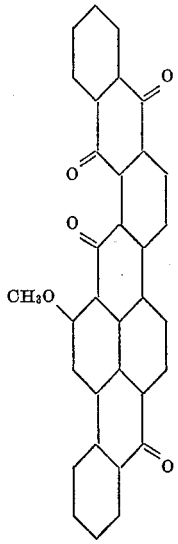

3. The vat dyestuff of the dibenzpyrenequinone series having the formula

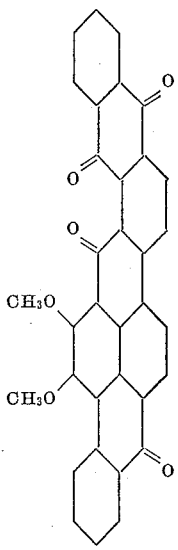

4. The vat dyestuff of the dibenzpyrenequinone series having the formula

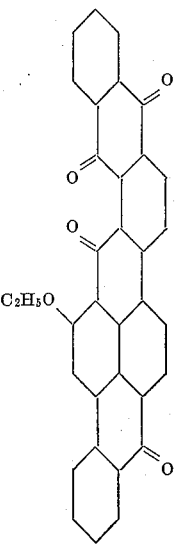

HEINRICH NERESHEIMER.
ROBERT HELD.
ANTON VILSMEIER.